United States Patent
Yoo et al.

(10) Patent No.: US 9,767,352 B2
(45) Date of Patent: Sep. 19, 2017

(54) APPARATUS AND METHOD FOR ANALYZING BODY PART ASSOCIATION

(71) Applicant: SAMSUNG ELECTRONICS CO., LTD., Suwon-si (KR)

(72) Inventors: Byung In Yoo, Seoul (KR); Hee Seob Ryu, Hwaseong-si (KR); Chang Kyu Choi, Seongnam-si (KR); Chang Kyo Lee, Cheongju-si (KR); Jae Joon Han, Seoul (KR)

(73) Assignee: Samsung Electronics Co., Ltd., Suwon-si (KR)

(*) Notice: Subject to any disclaimer, the term of this patent is extended or adjusted under 35 U.S.C. 154(b) by 733 days.

(21) Appl. No.: 13/713,351

(22) Filed: Dec. 13, 2012

(65) Prior Publication Data

US 2013/0182958 A1 Jul. 18, 2013

(30) Foreign Application Priority Data

Jan. 13, 2012 (KR) ........................ 10-2012-0004435

(51) Int. Cl.
*G06K 9/46* (2006.01)
*G06K 9/00* (2006.01)

(52) U.S. Cl.
CPC ................................ *G06K 9/00369* (2013.01)

(58) Field of Classification Search
None
See application file for complete search history.

(56) References Cited

U.S. PATENT DOCUMENTS

| 2008/0100622 | A1 | 5/2008 | Gordon |
| 2010/0195869 | A1* | 8/2010 | Geiss ........................... 382/103 |
| 2010/0197391 | A1 | 8/2010 | Geiss |
| 2010/0278384 | A1 | 11/2010 | Shotton et al. |
| 2011/0210915 | A1 | 9/2011 | Shotton et al. |
| 2011/0317871 | A1* | 12/2011 | Tossell et al. ..... G06K 9/00369 382/103 |
| 2012/0070070 | A1* | 3/2012 | Litvak .......................... 382/154 |
| 2012/0087573 | A1* | 4/2012 | Sharma et al. ............... 382/154 |

FOREIGN PATENT DOCUMENTS

| KR | 10-2007-0048752 | 5/2007 |
| KR | 10-2008-0069960 | 7/2008 |
| KR | 10-2009-0041417 | 4/2009 |
| KR | 10-2011-0013200 | 2/2011 |

* cited by examiner

*Primary Examiner* — Sumati Lefkowitz
*Assistant Examiner* — David Perlman
(74) *Attorney, Agent, or Firm* — NSIP Law (57) ABSTRACT

An apparatus and method for analyzing body part association. The apparatus and method may recognize at least one body part from a user image extracted from an observed image, select at least one candidate body part based on association of the at least one body part, and output a user pose skeleton related to the user image based on the selected at least one candidate body part.

20 Claims, 11 Drawing Sheets

APPARATUS AND METHOD FOR ANALYZING BODY PART ASSOCIATION

CROSS-REFERENCE TO RELATED APPLICATIONS

This application claims the priority benefit of Korean Patent Application No. 10-2012-0004435, filed on Jan. 13, 2012, in the Korean Intellectual Property Office, the disclosure of which is incorporated herein by reference.

BACKGROUND

1. Field

Example embodiments of the following description relate to an apparatus and method for analyzing association of body parts in recognizing a pose of a user, and more particularly, an apparatus and method for analyzing association of body parts in recognizing a pose of a user by taking into consideration a figure of a user shown in an image input at the time of recognition of a human body.

2. Description of the Related Art

Usually, humans use two eyes to correctly recognize a pose of the human body, even at a long distance and/or a low definition.

A method for recognizing a human body pose using a computer vision system has recently been gaining demanded in various fields. However, accurate recognition of the human body pose is still a difficult matter.

Generally, a model-based method has been mainly used for recognition of the human body pose.

However, the model-based method is inappropriate for estimation of complex poses performed in a sitting or lying state, such as, yoga poses, stretching, and the like, due to the occlusion of some body parts.

In addition, according to general body part recognition methods, errors may occur during the recognition when the same body part may be recognized in several different positions when a new non-learned body figure is detected or various costumes are applied. Therefore, connection positions may not be accurately estimated.

Accordingly, there is a need for an improved body part recognition method that increases recognition efficiency by taking into consideration a figure of a user shown in an image input at the time of recognition of a human body.

SUMMARY

The foregoing and/or other aspects are achieved by providing a body part association analysis apparatus including an image extraction unit to extract a user image from an observed image, a body recognition unit to recognize at least one body part from the user image, a body selection unit to select at least one candidate body part based on association of the at least one body part, and a pose determination unit to output a user pose skeleton related to the user image based on the selected at least one candidate body part.

The pose determination unit may include a connection structure recognition unit to extract a body part recognition result in consideration of a sequential connection structure of a human body based on the at least one candidate body part, and a candidate bone generation unit to generate at least one candidate bone using the body part recognition result.

The candidate bone generation unit may generate the at least one candidate bone by defining at least one association group of correlated candidate body parts among the at least one candidate body part.

The candidate bone generation unit may generate the candidate bone by connecting adjacent candidate body parts with respect to a body structure, selected from the at least one association group.

The pose determination unit may further include a misrecognition analysis unit to analyze a misrecognition result with respect to the at least one candidate bone.

The pose determination unit may further include a connection position analysis unit to extract connection positions with respect to the body parts in consideration of the misrecognition result.

The pose determination unit may restore current skeleton information connected to skeleton information of a previous image frame, by reflecting the body part recognition result.

The pose determination unit may include a seed selection unit to select a seed body part connected to a torso from the at least one body part, an allocation unit to allocate the seed body part as a base body part, a connection search unit to search for a connected body part which is connected to the base body part based on the body structure, from the at least one candidate body part, a comparison unit to calculate a depth continuity that connects the base body part with the connected body part and to compare the depth continuity with a preset value, and a candidate deletion unit to delete the selected candidate body part when the depth continuity is less than or equal to the preset value. When the connected body part is not a terminal body part, the connection search unit may search again for the connected body part by allocating the connected body part as the base body part.

The pose determination unit may include a both end selection unit to select both-end body parts corresponding to both ends of the at least one candidate bone, a matching determination unit to calculate an accuracy value (ACC value) by determining a matching degree between a line interconnecting the both-end body parts and a silhouette of the user image, a candidate deletion unit to delete the at least one candidate bone when the ACC value is less than or equal to a preset threshold or less than or equal to a currently stored maximum ACC value, and an ACC storage unit to store the calculated ACC value as a maximum ACC value when the ACC value is greater than the preset threshold or greater than the currently stored maximum ACC value. The pose determination unit may select the at least one candidate bone by repeating operations of the foregoing units.

The pose determination unit may include a both end selection unit to select both-end body parts corresponding to both ends of the at least one candidate bone, a first candidate deletion unit to delete the at least one candidate bone when a length of a line interconnecting the both-end both parts is not in a range between a maximum model length and a minimum model length stored in a human body model, and a second candidate deletion unit to determine whether the at least one candidate bone has a possible angle for an actual body structure, and to delete the at least one candidate bone when the at least one candidate bone does not have the possible angle. The pose determination unit may select the at least one candidate bone by repeating operations of the foregoing units.

The foregoing and/or other aspects are achieved by providing a body part association analysis method including extracting a user image from an observed image, recognizing at least one body part from the user image, selecting at least one candidate body part based on association of the at least one body part, and outputting a user pose skeleton related to the user image based on the selected at least one candidate body part.

The foregoing and/or other aspects are achieved by providing a method for increasing recognition efficiency, including selecting plural candidate body parts from a user image; generating at least one candidate bone by associating the plural candidate body parts; analyzing the associated plural candidate body parts; and determining a misrecognition result to be filtered off, based on the analyzing.

Additional aspects, features, and/or advantages of example embodiments will be set forth in part in the description which follows and, in part, will be apparent from the description, or may be learned by practice of the disclosure.

BRIEF DESCRIPTION OF THE DRAWINGS

These and/or other aspects and advantages will become apparent and more readily appreciated from the following description of the example embodiments, taken in conjunction with the accompanying drawings of which.

DETAILED DESCRIPTION

Reference will now be made in detail to exemplary embodiments of the present invention, examples of which are illustrated in the accompanying drawings, wherein like reference numerals refer to the like elements throughout.

In the description of the present invention, if detailed descriptions of related disclosed art or configuration are determined to unnecessarily make the subject matter of the present invention obscure, they will be omitted. Terms to be used below are defined based on their functions in the present invention and may vary according to users, user's intentions, or practices. Therefore, the definitions of the terms should be determined based on the entire specification.

A body part association analysis apparatus according to example embodiments may increase recognition efficiency of human poses by taking into consideration a figure of a user shown in an image input at the time of recognition of a human body.

For example, body parts including a head, a neck, shoulders, elbows, a torso, hands, knees, legs, and the like, may be recognized from an input user image. Next, a misrecognition result may be filtered off by analyzing association of the body parts from a result of the recognition.

Figure 1:
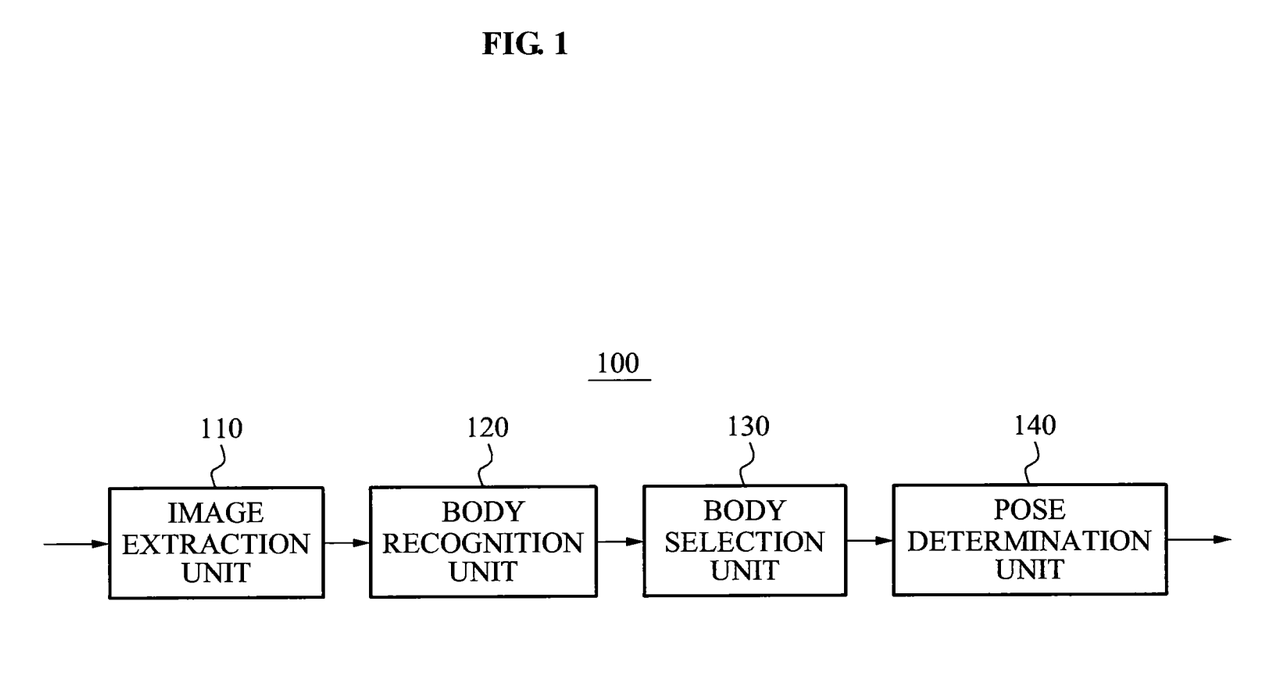
FIG. 1 is a block diagram illustrating a body part association analysis apparatus, according to example embodiments.

FIG. 1 illustrates a body part association analysis apparatus 100, according to example embodiments.

Referring to FIG. 1, the body part association analysis apparatus 100 may include an image extraction unit 110 that extracts a user image from an observed image, a body recognition unit 120 that recognizes at least one body part from the user image, a body selection unit 130 that selects at least one candidate body part based on association of the at least one body part, and a pose determination unit 140 that outputs a user pose skeleton related to the user image based on the selected at least one candidate body part.

Hereinafter, a method of analyzing body part association using the body part association analysis apparatus 100 of FIG. 1 will be described. For understanding of the example embodiments, reference numerals for the respective units shown in FIG. 1 will be cited throughout.

Figure 2:
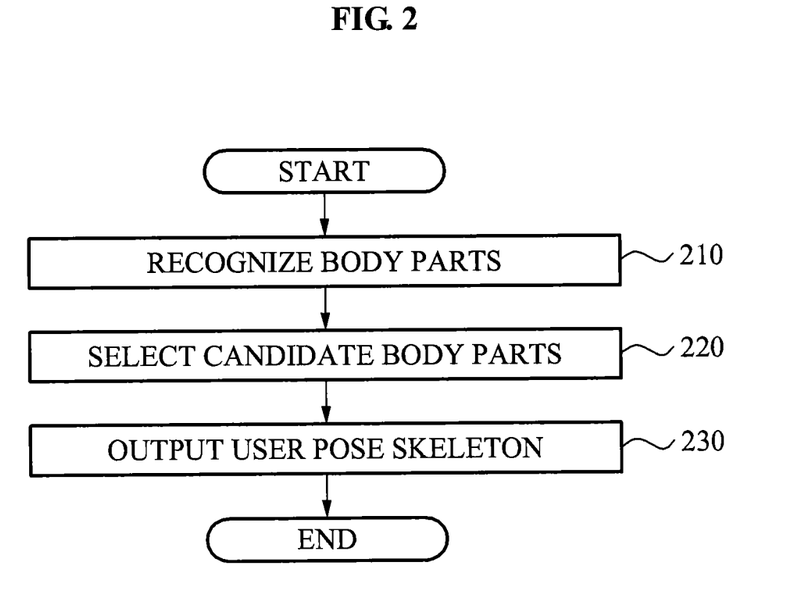
FIG. 2 is a flowchart illustrating a body part association analysis method, according to example embodiments.

FIG. 2 illustrates a body part association analysis method, according to example embodiments.

Referring to FIG. 2, the body part association analysis apparatus 100 extracts a user image from an observed image by the image extraction unit 110, and recognizes at least one body part from the user image by the body recognition unit 120, in operation 210.

In operation 210, the body part association analysis apparatus 100 may learn a background of the observed image of a photographing device through background learning, and output, as the user image, a difference image showing a difference between the learned background and a current image. However, a method for performing operation 210 is not specifically limited thereto.

The body part association analysis apparatus 100 may select at least one candidate body from the recognized at least one body part, using a body selection unit 130, in operation 220.

That is, in operation 220, the body part association analysis apparatus 100 may select the at least one candidate body part from the user image by body part classifiers (BPCL) learned through various machine learning methods, for example, adaptive boosting, random forest, decision tree, neural network, and the like.

The body part association analysis apparatus 100 may output a user pose skeleton related to the user image, based on the selected at least one candidate body part using a pose determination unit 140, in operation 230.

In operation 230, the position association analysis apparatus 100 may generate a candidate bone by inputting the at least one candidate body part, and thus, may finally output the final user pose skeleton by inspecting a misrecognition result.

Figure 3:
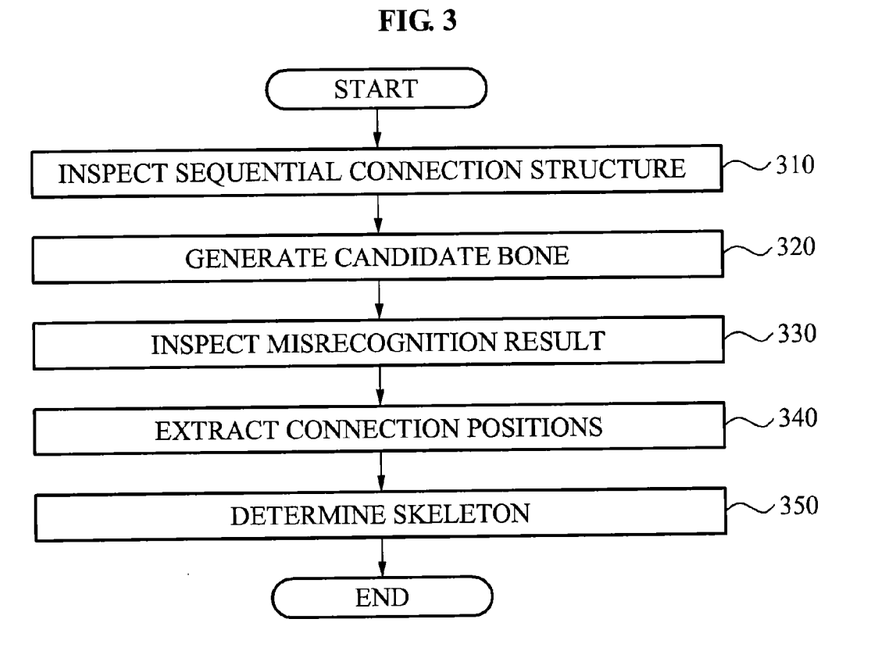
FIG. 3 is a diagram illustrating a body part association analysis method using association of body parts, according to example embodiments.

FIG. 3 illustrates a position association analysis method using association of body parts, according to example embodiments.

Referring to FIG. 3, in operation 310, the pose determination unit 140 may extract a body part recognition result by a connection structure recognition unit 140A (refer to FIGS. 10 and 11) in consideration of a sequential connection structure of a human body based on at least one candidate body part.

For example, the pose determination unit 140 may perform sequential alignment testing by inputting an image corresponding to the at least one body part, in extracting the body part recognition result.

In operation 320, the pose determination unit 140 may generate at least one candidate bone by a candidate bone generation unit 140B (refer to FIGS. 10 and 11) using the body part recognition result.

The candidate bone generation unit 140B may generate the at least one candidate bone by defining at least one association group of correlated candidate body parts selected from the at least one candidate body part.

The candidate bone generation unit 140B may generate the at least one candidate bone by connecting adjacent candidate body parts with respect to a body structure, selected from the at least one association group.

According to the example embodiments, various associations of the at least one candidate body parts may be generated. For example, to generate an association of the correlated candidate body parts from among the various associations, the candidate body parts may be classified into a plurality of groups, as shown in Table 1, for example. Thus, the at least one candidate bone may be generated.

TABLE 1

| Group | Classification |
| --- | --- |
| Torso group | Head, neck, spine, pelvis |
| Left arm group | Left shoulder, left elbow, left wrist, left hand |
| Right arm group | Right shoulder, right elbow, right wrist, right hand |
| Left leg group | Left thigh, left knee, left ankle, left foot |
| Right leg group | Right thigh, right knee, right ankle, right foot |

According to the example embodiments, the at least one candidate bone may be generated by connecting the adjacent candidate body parts with respect to the body structure from among the candidate body parts included in the respective groups.

The pose determination unit 140 may analyze a misrecognition result with respect to the at least one candidate bone, by a misrecognition analysis unit 140C (refer to FIGS. 10 and 11), in operation 330.

The body part association analysis apparatus 100 may detect the misrecognition result, for example, by sequential alignment testing, silhouette testing, bone length and angle testing, and the like.

The foregoing misrecognition result detection methods may be applied together or separately, and will be described in detail hereinafter.

A result of reflecting the misrecognition result detection methods may be used as an input of a Bayesian Estimation Framework, as expressed by Equation 1 below.

$$P(X|Z) = \max(P(X|X')P(X'|Z'))P(Z|X)P(X) \quad \text{[Equation 1]}$$

Here, P(X|Z) denotes a prediction probability of connection between a body part Z and a body part X, P(X|X') denotes a probability of conversion from a body part X' to the body part X, P(X'|Z') denotes a final connection estimation probability, P(Z|X) denotes an X connection probability according to a body part recognition probability, and P(X) denotes a model according to the X connection probability.

Figure 10:
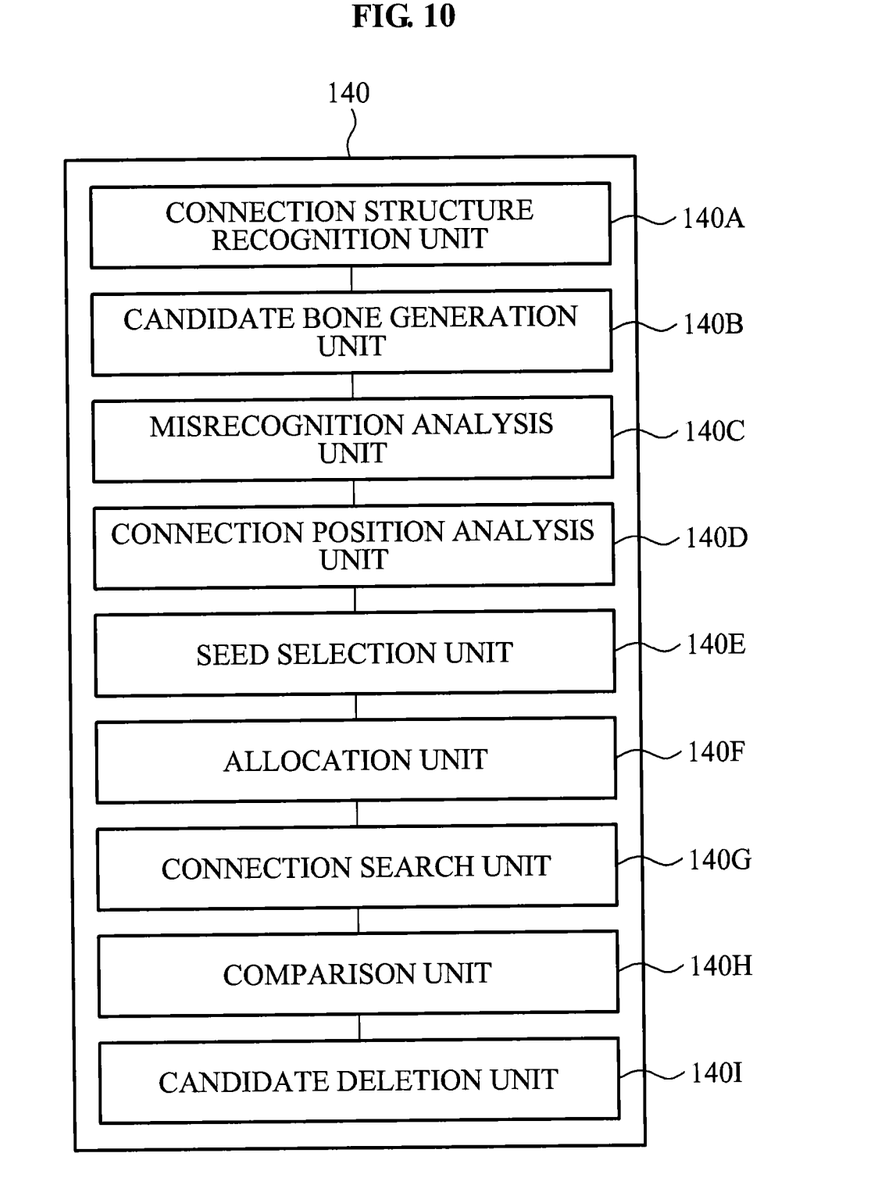
FIG. 10 is a block diagram illustrating a pose determination unit, according to example embodiments.
Figure 11:
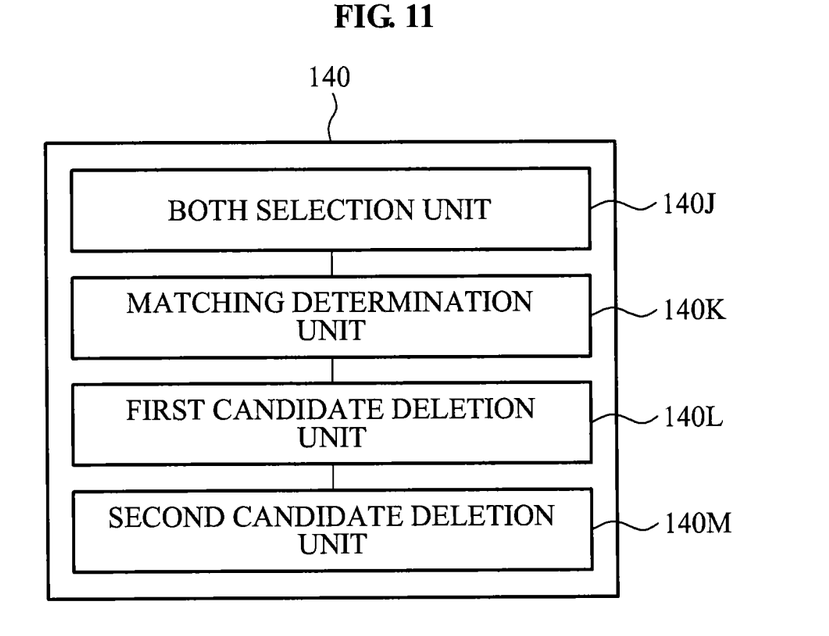
FIG. 11 is a block diagram illustrating additional units of the pose determination unit, according to example embodiments.

In operation 340, the pose determination unit 140 may extract connection positions with respect to the body parts in consideration of the misrecognition result, by a connection position analysis unit 140D (refer to FIGS. 10 and 11).

When the recognition result about the candidate body parts is not pruned, a plurality of associations of the candidate body parts may be generated, accordingly causing some inaccurate skeletons. Therefore, the connection positions may be accurately recognized at the respective body parts by detected the misrecognition result, and having the misrecognition result filtered off.

In operation 350, the pose determination unit 140 may restore current skeleton information connected to skeleton information of a previous image frame, by reflecting the body part recognition result.

Figure 4:
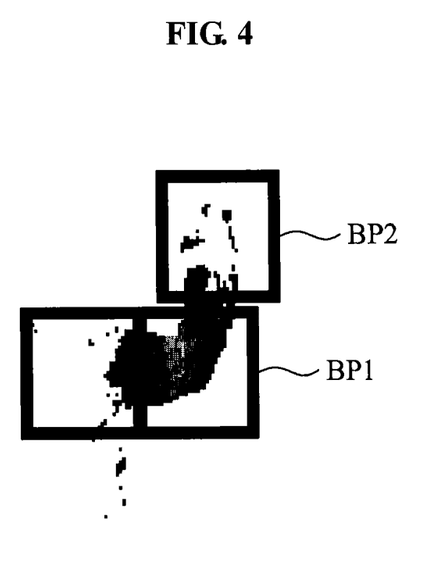
FIGS. 4 and 5 are diagrams illustrating candidate body parts selected by an operation of generating a candidate bone, according to example embodiments.
Figure 5:
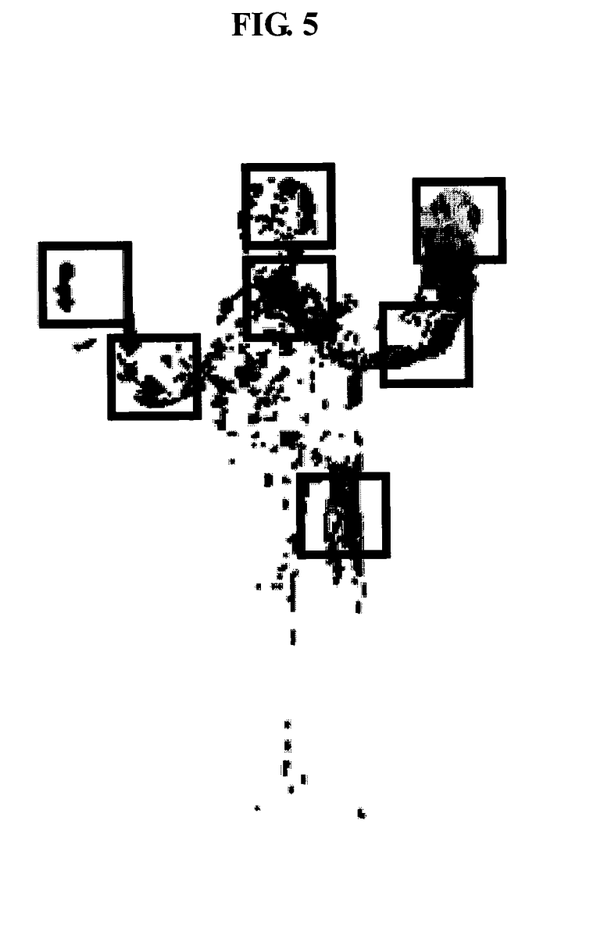

FIGS. 4 and 5 illustrate candidate body parts selected by operation 220, according to example embodiments.

Referring to FIGS. 4 and 5, a pose determination unit 140 may output a result that may be recognized as an elbow BP1 or a hand BP2 by association of learned candidate body parts.

Figure 6:
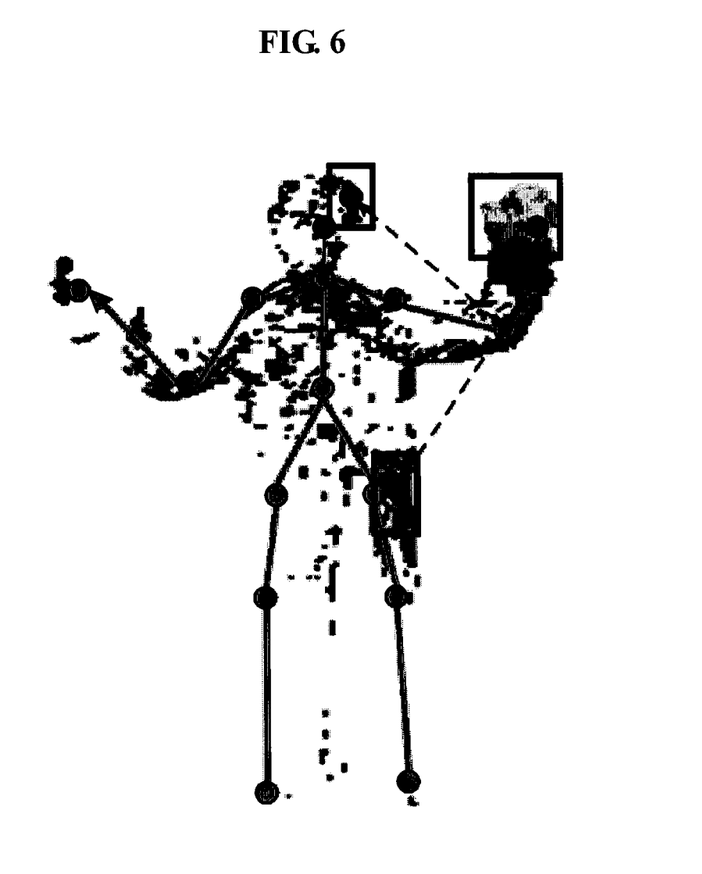
FIG. 6 is a diagram illustrating a candidate bone, according to example embodiments.

FIG. 6 illustrates a candidate bone, according to example embodiments.

Referring to FIG. 6, a pose determination unit 140, according to the example embodiments, may output three candidate body parts, for example, which may constitute a bone when connected with an elbow and a hand, and select any proper candidate body part from the three candidate body parts. Although this example shows that three candidate body parts are output, the present disclosure is not limited thereto.

The body part association analysis apparatus may recognize body parts on the basis of sequential alignment testing, and select proper candidate body parts by selecting adjacent body parts with respect to a body structure so as to delete a misrecognition result about the body parts from a user image of a user in various figures.

Figure 7:
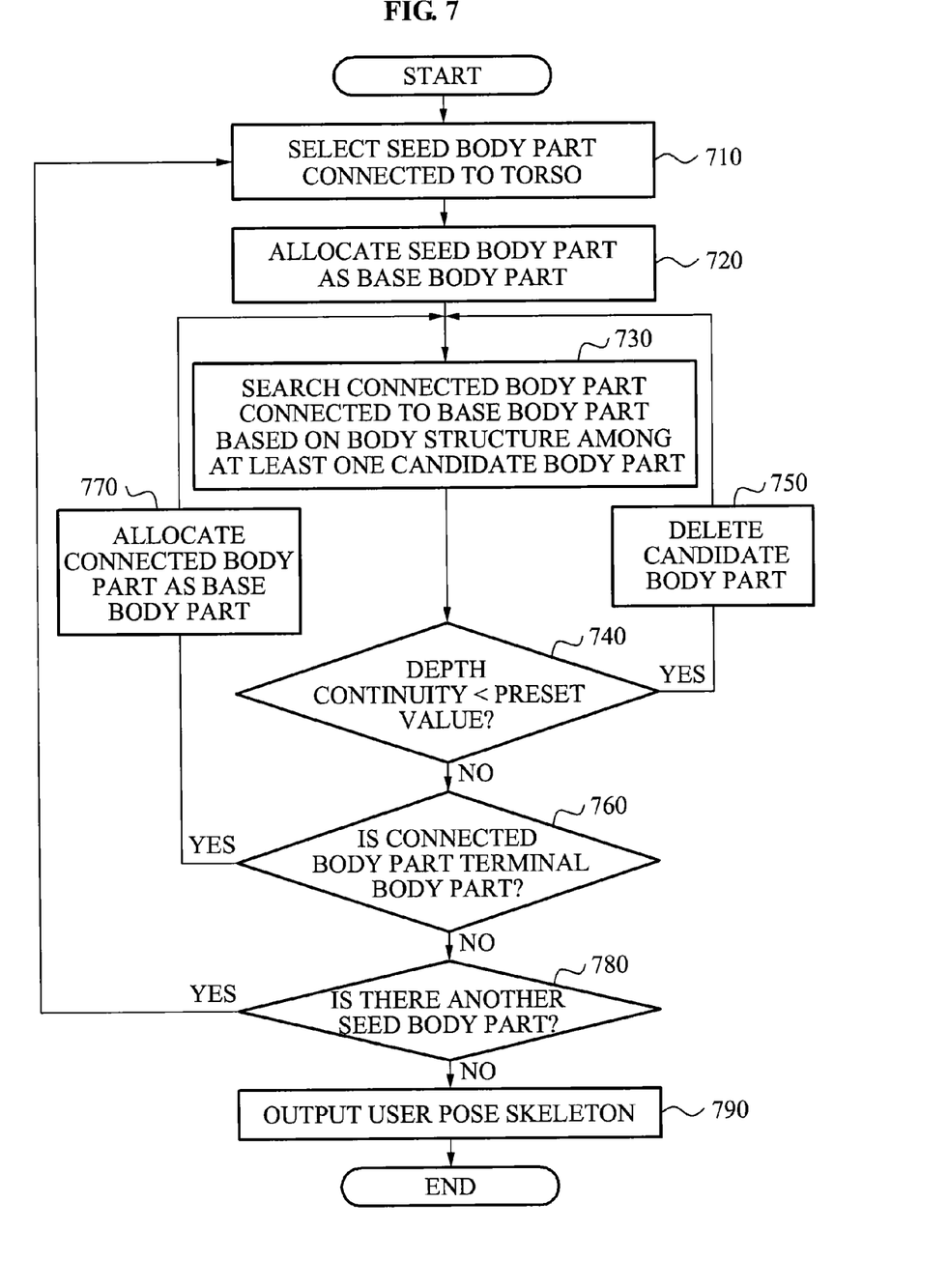
FIG. 7 is a flowchart illustrating a sequential alignment testing method, according to example embodiments.

FIG. 7 illustrates an exemplary sequential alignment testing method, according to example embodiments.

Referring to FIG. 7, in operation 710, a pose determination unit 140 may select a seed body part connected to a torso from at least one body part, using a seed selection unit 140E.

For example, the seed selection unit 140E (refer to FIGS. 10 and 11) may select a seed body part S connected to the torso from an image of at least one recognized body parts. The seed body part S may include a neck, a shoulder, a pelvis, and the like.

In operation 720, the pose determination unit 140 may allocate the seed body part S as a base body part using an allocation unit 140F (refer to FIGS. 10 and 11).

For example, the allocation unit 140F may allocate the seed body part S as the base body part Cbase.

In operation 730, the pose determination unit 140 may search for a connected body part connected to the base body part with respect to a body structure, from the at least one candidate body part, using a connection search unit 140G (refer to FIGS. 10 and 11).

The pose determination unit 140 may search for a connected body part C that may be connected to the base body part Cbase based on the body structure. For example, the connected body part of the neck may be a head, and the connected body part of the shoulders may be upper arms.

In operation 740, the pose determination unit 140 may calculate a depth continuity of a line that connects the base body part with the connected body part and may compare the depth continuity with a preset value, using a comparison unit 140H (refer to FIGS. 10 and 11).

For example, the comparison unit 140H may calculate the depth continuity of an imaginary line connecting the base body part Cbase with the connected body part C.

In operation 750, the pose determination unit 140 may delete the selected candidate body part when the depth continuity is less than or equal to the preset value, using a candidate deletion unit 140I (refer to FIGS. 10 and 11).

For example, when the depth continuity is less than or equal to a preset threshold, the candidate deletion unit 140I may consider the selected candidate body part to be a misrecognition, and thus, the selected candidate body part is not the connected body part C, and subsequently delete the connected body part C from the at least one candidate body part.

In operation 760, the pose determination unit 140 may determine whether the connected body part is a terminal body part, by the connection search unit 140G.

In operation 770, when the connected body part is the terminal body part, the connection search unit 140G may allocate the connected body part C as the base body part.

For example, when the connected body part C is not the terminal body part (examples of the terminal body part being hands, feet, and a head based on the body structure), the connection search unit 140G may allocate the connected body part C as the base body part Cbase, thereby continuously searching for the connected body part C based on the body structure.

In operation 780, when the connected body part is not the terminal body part, the connection search unit 140G may determine presence of another seed body part and search again for the connected body part by allocating the connected body part as the base body part.

The body part association analysis apparatus 100 may recognize the body parts on the basis of the silhouette testing. Also, to delete a misrecognition result about the body parts from a user image of a user in various figures, the body part association analysis apparatus 100 may select a recognition result by determining whether a silhouette image matches a candidate bone.

Figure 8:
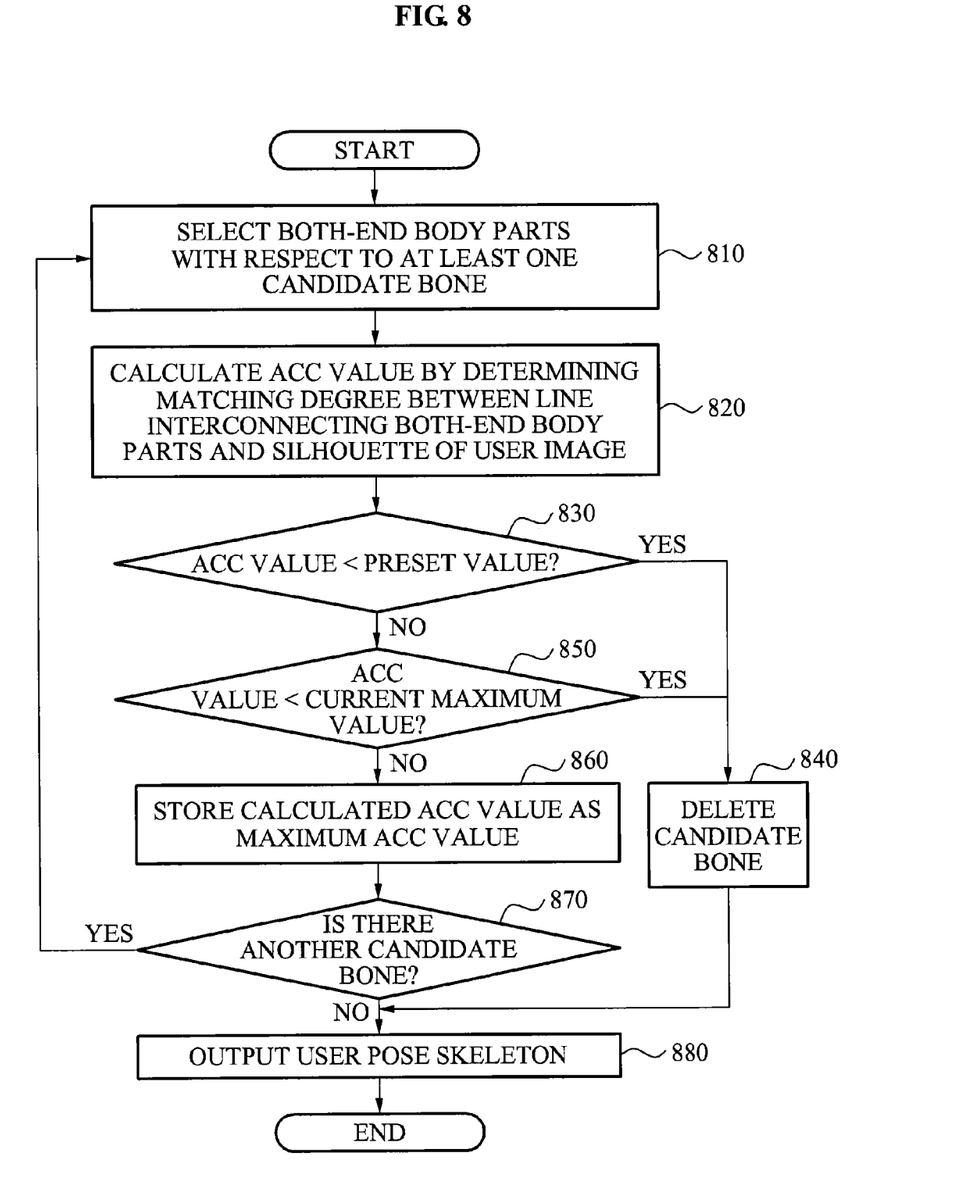
FIG. 8 is a flowchart illustrating a silhouette testing method, according to example embodiments.

FIG. 8 illustrates an exemplary silhouette testing method according to example embodiments.

Referring to FIG. 8, in operation 810, a pose determination unit 140 may select both-end body parts corresponding to both ends of at least one candidate bone, by a both end selection unit 140J.

For example, the both end selection unit 140J (refer to FIGS. 10 and 11) may perform the silhouette testing to extract a bone connecting an elbow BP1 and a hand BP2, and select body parts BP1 and BP2 disposed at both ends of a bone of the at least one candidate bone.

According to the body part recognition result, at least one result may be derived from the body parts BP1 and BP2 as shown in FIG. 4.

In operation 820, the pose determination unit 140 may calculate an accuracy value (ACC value) by determining a matching degree between a line interconnecting the both end body parts and a silhouette of the user image, by a matching determination unit 140K (refer to FIGS. 10 and 11).

For example, the matching determination unit 140K may detect, from the ACC value, the matching degree between the line interconnecting the body parts BP1 and BP2 and the silhouette of the user image.

In operation 830, the pose determination unit 140 may determine whether the ACC value is less than or equal to a preset threshold or less than or equal to a currently stored maximum ACC value (CURRENT_MAX). When the ACC value is less than the preset value or the CURRENT_MAX, the pose determination unit 140 may delete the at least one candidate bone by a candidate deletion unit 140I in operation 840.

In operation 850, the pose determination unit 140 may determine whether the ACC value is greater than the preset threshold or greater than the CURRENT_MAX. When the ACC value is greater than the preset threshold or the CURRENT_MAX, the pose determination unit 140 may store the ACC value as a maximum ACC value in operation 860.

The pose determination unit 140 may determine whether another candidate bone exists in operation 870, and select the at least one candidate bone by repeating the foregoing operations of the respective units, thereby finally outputting a user pose skeleton in operation 880.

The body part association analysis apparatus 100 may recognize the at least one body part based on the bone length and angle testing. To delete a misrecognition result about the body parts from a user image of a user in various figures, the body part association analysis apparatus 100 may select a recognition result by determining whether a length and an angle of the at least one candidate bone is similar to those of a skeleton model.

Figure 9:
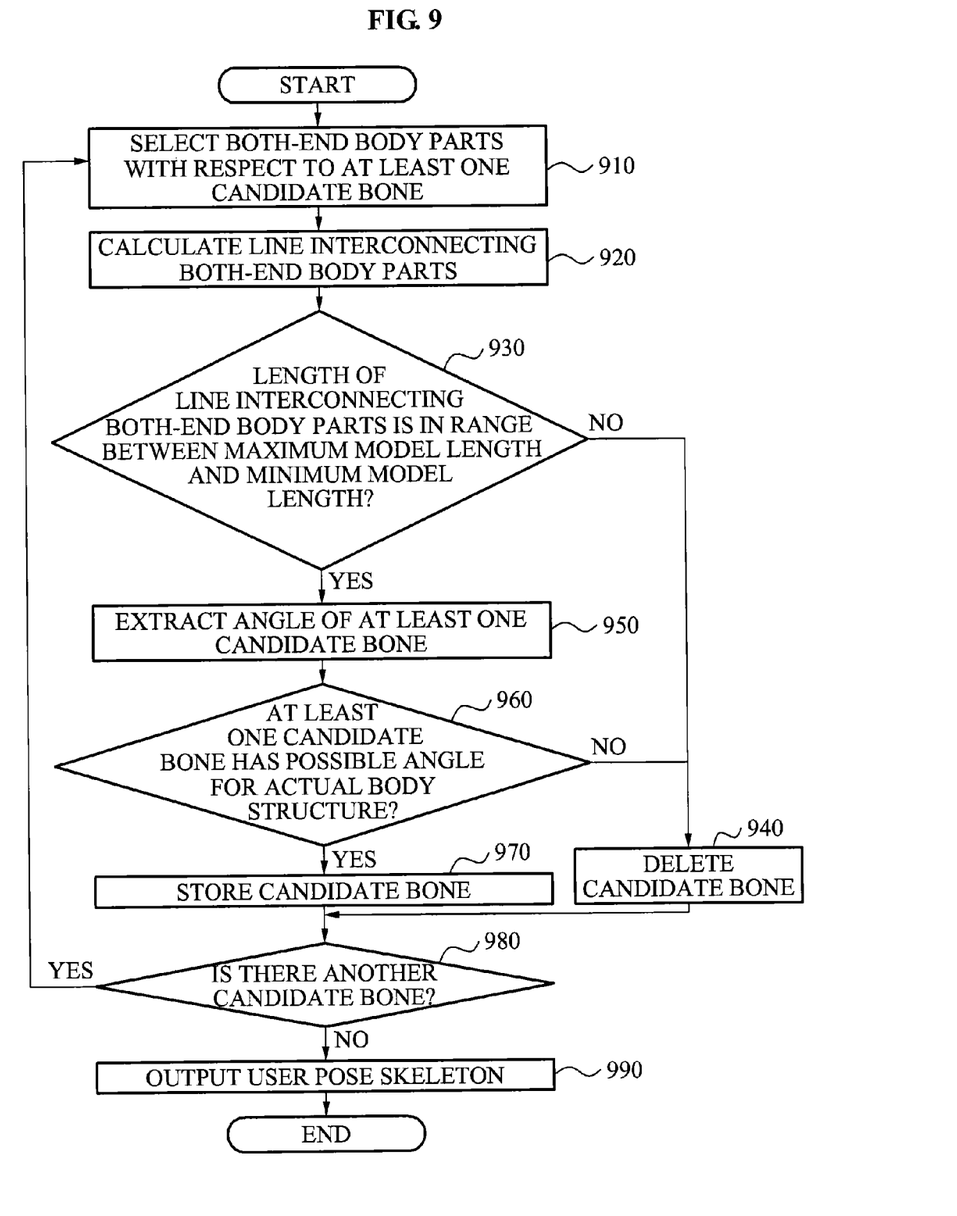
FIG. 9 is a flowchart illustrating a bone length and angle testing method, according to example embodiments

FIG. 9 illustrates an exemplary bone length and angle testing method, according to example embodiments.

Referring to FIG. 9, a pose determination unit 140 may select both-end body parts with respect to at least one candidate bone, using a both end selection unit 140J, in operation 910.

For example, the both end selection unit 140J may perform silhouette testing to extract a bone connecting an elbow and a hand, and select body parts BP1 and BP2 disposed at both ends of a bone of the at least one candidate bone.

According to the body part recognition result, at least one result may be derived from the body parts BP1 and BP2 as shown in FIG. 4.

The pose determination unit 140 may calculate a length of a line interconnecting the both-end body parts in operation 920.

Using a first candidate deletion unit 140L (refer to FIGS. 10 and 11), the pose determination unit 140 may determine whether the length of the line interconnecting the both-end body parts is in a range between a maximum model length and a minimum model length stored in a human body model in operation 930, and, when the length of the line is not in the range, may delete the at least one candidate bone in operation 940.

For example, when the length of the line interconnecting the selected body parts BP1 and BP2 is not in the range between a maximum length MODEL_MAX and a minimum length MODEL_MIN read from the human body model, the first candidate deletion unit 140L may consider the corresponding candidate bone as a misrecognized candidate bone and delete the corresponding candidate bone.

In operation 950, when the length of the line is in the range, the pose determination unit 140 may extract an angle of the at least one candidate bone.

In operation 960, the pose determination unit 140 may determine whether the at least one candidate bone has a possible angle for an actual body structure using a second candidate deletion unit 140M (refer to FIGS. 10 and 11). In operation 940, the pose determination unit 140 may delete the at least one candidate bone when the at least one candidate bone does not have the possible angle using the second candidate deletion unit 140M.

When the at least one candidate bone has the possible angle, the pose determination unit 140 may store the at least one candidate bone in operation 970.

The pose determination unit 140 may determine whether another candidate bone exists in operation 980. In addition, the pose determination unit 140 may select the at least one candidate bone by repeating the foregoing operations of the respective units until no more candidate bone remains, thereby finally outputting a user pose skeleton, in operation 990.

FIGS. 10 and 11 are block diagrams illustrating the various units included in the pose determination unit 140.

According to the example embodiments, a pose of a user in a new non-learned figure which is not used in user image learning may be recognized.

In addition, a pose of a user in a new costume may be recognized.

The methods according to the above-described example embodiments may be recorded in non-transitory computer-readable media including program instructions to implement various operations embodied by a computer. The media may also include, alone or in association with the program instructions, data files, data structures, and the like. The program instructions recorded on the media may be those specially designed and constructed for the purposes of the example embodiments, or they may be of the kind well-known and available to those having skill in the computer software arts.

The embodiments can be implemented in computing hardware (computing apparatus) and/or software, such as (in a non-limiting example) any computer that can store, retrieve, process and/or output data and/or communicate with other computers. The results produced can be displayed on a display of the computing hardware. A program/software implementing the embodiments may be recorded on non-transitory computer-readable media comprising computer-readable recording media. Examples of non-transitory computer-readable media include magnetic media such as hard disks, floppy disks, and magnetic tape; optical media such as CD ROM disks and DVDs; magneto-optical media such as optical disks; and hardware devices that are specially configured to store and perform program instructions, such as read-only memory (ROM), random access memory (RAM), flash memory, and the like. The media may be transfer media such as optical lines, metal lines, or waveguides including a carrier wave for transmitting a signal designating the program command and the data construction. Examples of program instructions include both machine code, such as produced by a compiler, and files containing higher level code that may be executed by the computer using an interpreter. Examples of the magnetic recording apparatus include a hard disk device (HDD), a flexible disk (FD), and a magnetic tape (MT). Examples of the optical disk include a DVD (Digital Versatile Disc), a DVD-RAM, a CD-ROM (Compact Disc-Read Only Memory), and a CD-R (Recordable)/RW. The described hardware devices may be configured to act as one or more software modules in order to perform the operations of the above-described example embodiments, or vice versa.

Further, according to an aspect of the embodiments, any combinations of the described features, functions and/or operations can be provided.

Moreover, the body part association analysis apparatus may include at least one processor to execute at least one of the above-described units and methods.

Although example embodiments have been shown and described, it would be appreciated by those skilled in the art that changes may be made in these example embodiments without departing from the principles and spirit of the disclosure, the scope of which is defined in the claims and their equivalents.

What is claimed is:

1. A body part association analysis apparatus, comprising:
an image extraction processor configured to extract a user image from an observed image;
a body recognition processor configured to recognize at least one body part from the extracted user image;
a body selection processor configured to select at least one candidate body part from the extracted user image based on the recognized at least one body part; and
a pose determination processor configured to output a user pose skeleton related to the extracted user image by analyzing an association of body parts based on the selected at least one candidate body part,
wherein the pose determination processor is further configured to
select a seed body part, from the at least one candidate body part, connected to a torso,
allocate the seed body part as a base body part,
search for a connected body part which is connected to the base body part based on a body structure, from the at least one candidate body part,
calculate a depth continuity of a line that connects the base body part with the connected body part and to compare the depth continuity with a preset value, and
delete the selected at least one candidate body part when the depth continuity is less than or equal to the preset value,
wherein, in response to the connected body part not being a terminal body part, the pose determination processor is configured to continue searching for the connected body part by allocating the connected body part as the base body part.

2. The body part association analysis apparatus of claim 1, wherein the pose determination processor comprises:
a connection structure recognition processor configured to extract a body part recognition result based on a sequential connection structure of a human body using the selected at least one candidate body part; and
a candidate bone generation processor configured to generate the at least one candidate bone using the body part recognition result.

3. The body part association analysis apparatus of claim 1, wherein the user image comprises a difference image showing a difference between a background of the observed image and a current image.

4. The body part association analysis apparatus of claim 1, wherein the analyzing comprises classifying candidate body parts into association groups of correlated candidate body parts, generating at least one candidate bone by connecting two adjacent candidate body parts included in an association group, analyzing a misrecognition result with respect to the at least one candidate bone, and deleting a candidate bone corresponding to the misrecognition result among the at least one candidate bone.

5. The body part association analysis apparatus of claim 2, wherein the pose determination processor further comprises a misrecognition analysis processor configured to analyze a misrecognition result with respect to the generated at least one candidate bone.

6. The body part association analysis apparatus of claim 2, wherein the pose determination processor restores current skeleton information connected to skeleton information of a previous image frame, by reflecting the extracted body part recognition result.

7. The body part association analysis apparatus of claim 2, wherein the pose determination processor comprises:

a both end selection processor configured to select both-end body parts corresponding to both ends of the at least one candidate bone;
a matching determination processor configured to calculate an accuracy value (ACC value) by determining a matching degree between a line interconnecting the both-end body parts and a silhouette of the user image;
a candidate deletion processor configured to delete the at least one candidate bone when the ACC value is less than or equal to a preset threshold or less than or equal to a currently stored maximum ACC value; and
an ACC memory storage to store the calculated ACC value as a maximum ACC value when the calculated ACC value is greater than the preset threshold or greater than the currently stored maximum ACC value, and
wherein the pose determination processor determines whether another candidate bone exists, and the outputting of the user pose skeleton selects the at least one candidate bone.

8. The body part association analysis apparatus of claim 2, wherein the pose determination processor comprises:
a both end selection processor configured to select both-end body parts corresponding to both ends of the at least one candidate bone;
a first candidate deletion processor configured to delete the at least one candidate bone when a length of a line interconnecting the both-end body parts is not in a range between a maximum model length and a minimum model length stored in a human body model; and
a second candidate deletion processor configured to determine whether the at least one candidate bone has a possible angle for an actual body structure, and to delete the at least one candidate bone when the at least one candidate bone does not have the possible angle,
wherein the pose determination processor determines whether another candidate bone exists, and the outputting of the user pose skeleton selects the at least one candidate bone.

9. The body part association analysis apparatus of claim 5, wherein the misrecognition result is detected using at least one of sequential alignment testing, silhouette testing, and bone length and angle testing.

10. The body part association analysis apparatus of claim 5, wherein the pose determination processor further comprises a connection position analysis processor configured to extract connection positions with respect to the selected at least one candidate body part based on the misrecognition result.

11. A body part association analysis method comprising:
extracting a user image from an observed image;
recognizing at least one body part from the extracted user image;
selecting at least one candidate body part from the extracted user image based on the at least one body part; and
outputting a user pose skeleton related to the extracted user image by analyzing an association of body parts based on the selected at least one candidate body part,
wherein the outputting of the user pose skeleton comprises
selecting a seed body part, from at least one candidate body part, connected to a torso,
allocating the seed body part as a base body part,
searching for a connected body part which is connected to the base body part based on a body structure, from the at least one candidate body part,
calculating a depth continuity of a line that connects the base body part with the connected body part and to compare the depth continuity with a preset value,
deleting the selected at least one candidate body part when the depth continuity is less than or equal to the preset value, and
searching again for another connected body part by allocating the connected body part as the base body part when the connected body part is not a terminal body part.

12. The body part association analysis method of claim 11, wherein the outputting of the user pose skeleton comprises:
extracting a body part recognition result based on a sequential connection structure of a human body using the at least one candidate body part; and
generating at least one candidate bone using the body part recognition result.

13. A non-transitory computer readable recording medium storing a program to cause a computer to implement the method of claim 11.

14. The body part association analysis method of claim 12, wherein the generating of the at least one candidate bone comprises:
generating at least one candidate bone by defining at least one association group of correlated candidate body parts among the at least one candidate body part.

15. The body part association analysis method of claim 12, wherein the outputting of the user pose skeleton comprises:
restoring current skeleton information connected to skeleton information of a previous image frame, by reflecting the body part recognition result.

16. The body part association analysis method of claim 12, wherein the outputting of the user pose skeleton comprises:
selecting both-end body parts corresponding to both ends of the at least one candidate bone;
calculating an accuracy value (ACC value) by determining a matching degree between a line interconnecting the both-end body parts and a silhouette of the user image;
deleting the at least one candidate bone when the calculated ACC value is less than or equal to a preset threshold or is less than or equal to a currently stored maximum ACC value; and
storing the calculated ACC value as a maximum ACC value when the calculated ACC value is greater than the preset threshold or is greater than the currently stored maximum ACC value, and
wherein whether another candidate bone exists is determined, and the outputting of the user pose skeleton selects the at least one candidate bone.

17. The body part association analysis method of claim 12, wherein the outputting of the user pose skeleton comprises:
selecting both-end body parts corresponding to both ends of the at least one candidate bone;
deleting the at least one candidate bone when a length of a line interconnecting the both-end both parts is not in a range between a maximum model length and a minimum model length stored in a human body model;
determining whether the at least one candidate bone has a possible angle for an actual body structure, and deleting the at least one candidate bone when the at least one candidate bone does not have the possible angle, and wherein whether another candidate bone exists is determined, and the outputting of the user pose skeleton selects the at least one candidate bone.

18. The body part association analysis method of claim 14, wherein the generating of the at least one candidate bone further comprises:
analyzing a misrecognition result with respect to the at least one candidate bone.

19. The body part association analysis method of claim 18, wherein the generating of the at least one candidate bone further comprises:
extracting connection positions with respect to the at least one candidate body part based on the misrecognition result.

20. A method for increasing recognition efficiency, comprising:
selecting plural candidate body parts from a user image;
generating at least one candidate bone by associating the plural candidate body parts;
analyzing the associated plural candidate body parts for a misrecognition result; and
determining the misrecognition result to be filtered off, based on the analyzing,
wherein the determining of the misrecognition result comprises
selecting a seed body part, from at least one candidate body part, connected to a torso,
allocating the seed body part as a base body part,
searching for a connected body part which is connected to the base body part based on a body structure, from the at least one candidate body part,
calculating a depth continuity of a line that connects the base body part with the connected body part and to compare the depth continuity with a preset value,
deleting the selected candidate body part when the depth continuity is less than or equal to the preset value, and
searching again for another connected body part by allocating the connected body part as the base body part when the connected body part is not a terminal body part.

\* \* \* \* \*